(12) United States Patent
Thiebot et al.

(10) Patent No.: US 9,471,827 B2
(45) Date of Patent: Oct. 18, 2016

(54) METHOD OF VALIDATION OF THE USE OF A REAL FINGER AS SUPPORT OF A FINGERPRINT

(71) Applicant: MORPHO, Issy-les-Moulineaux (FR)

(72) Inventors: Alain Thiebot, Issy-les-Moulineaux (FR); Benoît Thouy, Issy-les-Moulineaux (FR); Jean-François Boulanger, Issy-les-Moulineaux (FR); Julien Doublet, Issy-les-Moulineaux (FR)

(73) Assignee: MORPHO, Issy les Moulineaux (FR)

( * ) Notice: Subject to any disclaimer, the term of this patent is extended or adjusted under 35 U.S.C. 154(b) by 127 days.

(21) Appl. No.: 14/602,880

(22) Filed: Jan. 22, 2015

(65) Prior Publication Data

US 2015/0220771 A1 Aug. 6, 2015

(30) Foreign Application Priority Data

Feb. 4, 2014 (FR) ...................................... 14 50834

(51) Int. Cl.
*G06K 9/00* (2006.01)
*G06K 9/03* (2006.01)

(52) U.S. Cl.
CPC ......... *G06K 9/00114* (2013.01); *G06K 9/0008* (2013.01); *G06K 9/0012* (2013.01); *G06K 9/00013* (2013.01); *G06K 9/00107* (2013.01); *G06K 9/036* (2013.01)

(58) Field of Classification Search
CPC ............. G06K 9/008; G06K 9/00114; G06K 9/0012; G06K 9/0013
See application file for complete search history.

(56) References Cited

U.S. PATENT DOCUMENTS 6,567,539 B1 * 5/2003 Benezeth ........... G06K 9/00013
356/71
8,724,861 B1 * 5/2014 Sun ..................... G06K 9/00013
345/158

(Continued)

FOREIGN PATENT DOCUMENTS

EP 2518684 A1 10/2012
FR 2981769 A1 4/2013

OTHER PUBLICATIONS

Maltoni D et al.; "Handbook of Fingerprint Recognition, Liveness Detection Techniques;" Handbook of Fingerprint Recognition; Springer; London, GB; pp. 386-391; Jan. 1, 2009; XP002607754.

(Continued)

*Primary Examiner* — Jingge Wu
(74) *Attorney, Agent, or Firm* — Oliff PLC; R. Brian Drozd

(57) ABSTRACT

Validation of using a finger as support of a fingerprint may include:
  placing the support such that it bears;
  capturing a captured image of the print;
  transforming the captured image into a resulting image by passage through a low-pass filter;
  locating on the resulting image an origin point, the intensity of whose pixel is representative of the maximum pressure exerted on the support;
  verifying that, on the resulting image, for a plurality of radii issuing from the origin point, and for each of said radii, for a plurality of points M, the intensity of the pixel of each point M of said radius is representative of a decline in the pressure exerted on the support as the distance from the origin point to the point M increases, and
  a decision as regards the validity of the support is taken as a function of the results of the verification step.

11 Claims, 2 Drawing Sheets

(56) References Cited

U.S. PATENT DOCUMENTS

Figure 3:
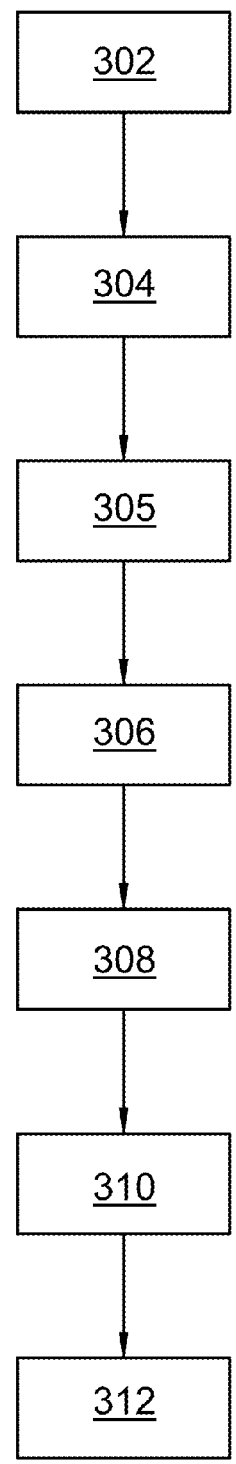

| | | | |
|---|---|---|---|
| 2003/0091724 A1* | 5/2003 | Mizoguchi | G06K 9/00087 427/1 |
| 2009/0092279 A1* | 4/2009 | Tabata | G06K 9/036 382/100 |
| 2010/0066697 A1 | 3/2010 | Jacomet et al. | |
| 2010/0266168 A1* | 10/2010 | Wang | G06K 9/001 382/124 |
| 2013/0051638 A1* | 2/2013 | Monden | G06K 9/0008 382/125 |
| 2013/0101186 A1* | 4/2013 | Walch | G06K 9/00093 382/125 |
| 2014/0270414 A1* | 9/2014 | Slaby | G06K 9/00013 382/124 |

OTHER PUBLICATIONS

Sep. 26, 2014 Search Report issued in French Patent Application No. 14/50834.

Farina et al.; "Fingerprint Minutiae Extraction from Skeletonized Binary Images;" Pattern Recognition; vol. 32; 1999; pp. 877-889.

* cited by examiner

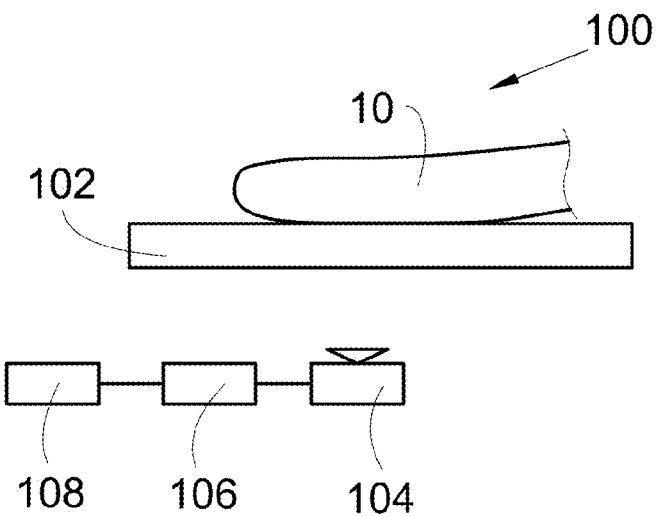
Fig. 1
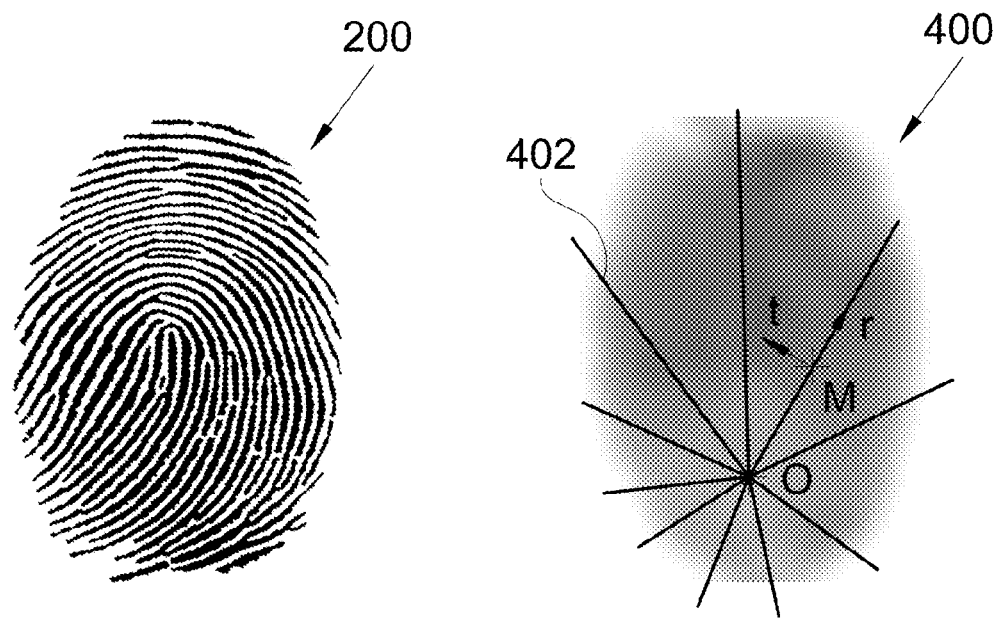
Fig. 2
Fig. 4

METHOD OF VALIDATION OF THE USE OF A REAL FINGER AS SUPPORT OF A FINGERPRINT

The present invention relates to a method of validation of the use of a real finger as support of a fingerprint, as well as to a validation device implementing such a method.

A device for identifying an individual by their fingerprint consists of a sensor, a comparison means, a decision taking means.

The sensor exhibits a capture surface which serves for the finger to bear on and through which an image of the fingerprint of the finger is captured. The comparison means compares the captured image or the biometric templates which arise from the image with the images or the biometric templates of a database which contains the images or templates of people previously recorded in the identification device. The decision taking means is intended to take a decision as regards the identification of the individual with the help of the result of the comparisons.

Several technologies commonly exist in the field of fingerprint sensors for capturing the images of a finger in contact with an acquisition surface, in particular optical technologies, capacitive technologies, measurements of electric, thermal, ultra-sonic fields, or else by pressure measurement.

Certain ill-intentioned individuals attempt to identify themselves fraudulently by using decoys to induce the identification device to make an error.

Various validation methods are known for validating the fact that the finger bearing the fingerprint is a real finger.

In particular, it is known to use the deformation of the finger on the sensor to verify whether said deformation does indeed correspond to skin whose elasticity characteristics are different from those of the materials used to produce the decoys.

In particular, it is known to rotate the finger on the capture surface so as to induce a distortion of the image thereby making it possible to analyze the elasticity of the skin or of the material supporting the fraud.

But such a method is not very ergonomic since such a movement must be explained to the individual who wishes to be identified, this being inconceivable, for example in the case of an identification device that is not supervised.

An object of the present invention is to propose a method of validation making it possible to validate the use of a real finger as bearer of a fingerprint which does not exhibit the drawbacks of the prior art, and which, in particular, is highly ergonomic in respect of the individual.

For this purpose, there is proposed a method of validation of the use of a real finger as support of a fingerprint, implemented by a validation device comprising a capture surface on which said support bears, a sensor intended to capture an image of the fingerprint, a processing module and a decision taking module, said method of validation comprising:

- a positioning step during which the support is placed such that it bears against the capture surface,
- a capture step during which the sensor captures a so-called captured image of the print,
- a filtering step during which the processing module transforms the captured image into a resulting image by passage through a low-pass filter whose cutoff frequency is much lower than the frequency of the ridges of a print,
- a locating step during which the processing module locates on the resulting image, an origin point O, the intensity of whose pixel is representative of the maximum pressure exerted on the support,
- a verification step during which the processing module verifies that, on the resulting image, for a plurality of radii issuing from the origin point O, and for each of said radii, for a plurality of points M, the intensity of the pixel of each point M of said radius is representative of a decline in the pressure exerted on the support as the distance from the origin point O to the point M increases, and
- a decision taking step during which the decision taking module takes a decision as regards the validity of the support as a function of the results of the verification step.

Advantageously, said cutoff frequency is of the order of from 0.1 to 1 cycle per mm.

Advantageously, the verification step consists in verifying that starting from the origin point O and on each radius issuing from the origin point O, the intensity gradient of each point M is negative.

Advantageously, the decision taking step is based on a cumulative criterion denoted Dism(P,O) and representing the deviation of the intensity profile of the actual intensity profile P from the theoretical model of intensity centered at O of a real finger and on a comparison of this deviation Dism(P,O) with respect to a threshold.

Advantageously, the deviation Dism(P,O) is given by the formula:

$$Dism(P, O) = \frac{1}{\text{Area}(P)} \int_0^{2\pi} \int_0^{R_{max}} L(\nabla_r^O P(r, \theta)) \cdot dr \cdot d\theta \qquad (3)$$

where:
- $\nabla_r^O P(r,\theta)$ is the projection on the radial local basis at M relating to O of the intensity gradient at the point M of the resulting image with polar coordinates $(r,\theta)$,
- L is a zero function on $\mathbb{R}^-$ and an increasing function on $\mathbb{R}^{+*}$,
- $R_{max}$ is the maximum distance between the origin point O and any point M of the resulting image, and
- Area(P) is the area of the region considered around the point M.

Advantageously, the method of validation comprises a preprocessing step intended to improve the rendition of the resulting image, between the capture step and the filtering step.

According to a particular embodiment, the preprocessing step consists in applying to the pixels (x, y) of the captured image, a function F(x, y) defined by the formula:

$$F(x, y) = (255 - p(x, y)) \cdot \frac{R_r(x, y)}{R_{ir}(x, y)} \qquad (7)$$

where when the pixel (x, y) does not belong to the pixels of the ridges, $R_r(x, y)$ is equal to the average value of the local widths of adjacent ridges on either side of the valley including the pixel, at the level of said pixel, and where when the pixel (x, y) belongs to the pixels of the ridges, $R_r(x, y)$ equals the local width of the ridge in this pixel (x, y), and where when the pixel (x, y) does not belong to the pixels of the valleys, $R_{ir}(x, y)$ is equal to the average value of the local widths of adjacent valleys on either side of the ridge including this pixel, at the level of said pixel, and where when the pixel (x, y) belongs to the pixels of the valleys, $R_{ir}(x, y)$ equals the local width of the valley in this pixel (x, y).

According to another particular embodiment, the preprocessing step consists in applying to the pixels (x, y) of the captured image, a function F(x, y) defined by the formula:

$$F(x, y) = (255 - p(x, y)) \cdot \frac{R_r(x, y)}{R_{ir}(x, y)} \tag{7}$$

where when the pixel (x, y) does not belong to the skeleton of the ridges, $R_r(x, y)$ is zero, and where when the pixel (x, y) belongs to the skeleton of the ridges, $R_r(x, y)$ equals the local width of the ridge in this pixel (x, y), where when the pixel (x, y) does not belong to the skeleton of the valleys, $R_{ir}(x, y)$ is zero, and where when the pixel (x, y) belongs to the skeleton of the valleys, $R_{ir}(x, y)$ equals the local width of the valley in this pixel (x, y).

According to another particular embodiment the preprocessing step consists in applying to the pixels (x, y) of the captured image, a function F(x, y) defined by the formula:

$$F(x, y) = (255 - p(x, y)) \cdot \frac{R_r(x, y)}{R_{ir}(x, y)} \tag{7}$$

where $R_r(x, y)$ is the number of pixels of ridges in a zone centered on the pixel (x,y), and where $R_{ir}(x, y)$ is the number of pixels of valleys in a zone centered on the pixel (x,y).

Advantageously, the locating step consists in choosing the origin point O as the point of the resulting image exhibiting the highest intensity.

The invention also proposes a validation device comprising:
- a capture surface on which said support bears,
- a sensor intended to capture an image of the fingerprint,
- a processing module comprising:
  filtering means intended to transform the captured image into a resulting image by passage through a low-pass filter whose cutoff frequency is much lower than the frequency of the ridges of a print,
  locating means intended to locate on the resulting image, an origin point O, the intensity of whose pixel is representative of the maximum pressure exerted on the support,
  verification means intended to verify that, on the resulting image, for a plurality of radii issuing from the origin point O, and for each of said radii, for a plurality of points M, the intensity of the pixel of each point M of said radius is representative of a decline in the pressure exerted on the support as the distance from the origin point O to the point M increases, and
- a decision taking module intended to take a decision as regards the validity of the support as a function of the results transmitted by the verification means.

Figure 5:
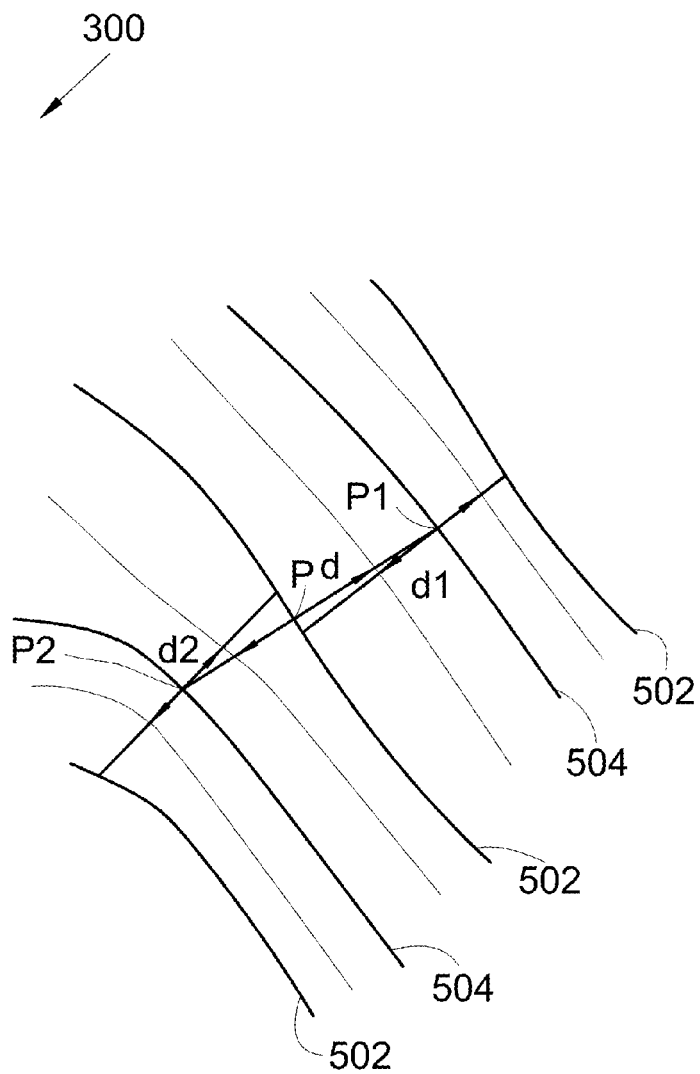

The abovementioned characteristics of the invention, as well as others, will be more clearly apparent on reading the following description of an exemplary embodiment, said description being given in conjunction with the attached drawings, among which:

FIG. 1 is a schematic representation of a validation device according to the invention, FIG. 2 is an image of a fingerprint captured by a validation device according to the invention, FIG. 3 is an algorithm of a method of validation according to the invention, FIG. 4 is an image of the fingerprint of FIG. 2 such as modified in the course of the method of validation, and FIG. 5 shows a diagram serving as support to calculation.

A real finger exhibits a particular elasticity which means that when it is pressed against a capture surface, it exhibits a homogeneous deformation which consists of a zone of maximum pressure and a decline in the pressure on moving away from this zone. The uniqueness of this zone stems from the fact that it is possible to exert only a constant pressure on the whole of the finger and the cylindrical shape of the finger means that the pressure decreases on approaching the edges of the finger.

When a finger is covered with a decoy or when the finger is false, the elasticity of the decoy is different from the elasticity of a real finger, and when the decoy is pressed against a capture surface, it does not deform homogeneously and there then exist several high pressure zones separated by low pressure zones.

The principle of the invention therefore consists in seeking an origin point of high pressure, and in verifying that starting from this origin point the pressure decreases.

FIG. 1 shows a validation device 100 which is intended to validate the use of a real finger as bearer of a fingerprint.

The validation device 100 comprises:
- a capture surface 102 on which a support 10 bearing a fingerprint is placed such that it bears,
- a sensor 104 intended to capture the image of the fingerprint through the capture surface 102,
- a processing module 106 intended to receive the image of the fingerprint captured by the sensor 104 and to process it as described hereinafter, and
- a decision taking module 108 intended to take a decision regarding the fact that the support 10 is a real finger or a false finger, with the help of the information transmitted by the processing module 106.

FIG. 2 is a captured image 200 of a print such as captured by the sensor 104 and transmitted to the processing module 106. Conventionally, the print exhibits ridges and valleys. Here, the captured image 200 is a gray level image and the ridges appear here as black on a white background.

FIG. 4 shows an image 400 which results from the passage of the captured image 200 through a filtering step (306, FIG. 3). The ridges and the valleys are no longer discernable. The image 400 is representative of the pressures which are exerted at all points of the support 10 and is called the resulting image 400 hereinafter. In the embodiment presented here of the invention, the lighter the zone of the resulting image 400, the bigger the pressure exerted in this zone.

FIG. 3 is an algorithm of a method of validation 300 implemented by the validation device 100.

The method of validation 300 comprises:
- a positioning step 302 during which the support 10 bearing the print is placed such that it bears against the capture surface 102,
- a capture step 304 during which the sensor 104 captures the captured image 200 of the print,
- a filtering step 306 during which the processing module 106 transforms the captured image 200 into the resulting image 400 by passage through a low-pass filter whose cutoff frequency is much lower than the frequency of the ridges of a print,
- a locating step 308 during which the processing module 106 locates on the resulting image 400, an origin point O, the intensity of whose pixel is representative of the maximum pressure exerted on the support 10, a verification step 310 during which the processing module 106 verifies that, on the resulting image 400, for a plurality of radii 402 issuing from the origin point O, and for each of said radii 402, for a plurality of points M, the intensity of the pixel of each point M of said radius 402 is representative of a decline in the pressure exerted on the support 10 as the distance from the origin point O to the point M increases, and a decision taking step 312 during which the decision taking module 108 takes a decision as regards the validity of the support 10 as a function of the results of the verification step 310.

The method of validation 300 therefore allows constraint-free use for the person presenting their finger 10.

The low-pass filter will be for example a Gaussian filter, a median filter, an averaging filter or any other filter making it possible to preserve only the low-frequency information of the captured image 200.

The locating step 308 consists in choosing the origin point O as the point of the resulting image 400 exhibiting the highest intensity.

The processing module 106 comprises:

filtering means intended to transform the captured image 200 into the resulting image 400 by passage through a low-pass filter whose cutoff frequency is much lower than the frequency of the ridges of a print, locating means intended to locate on the resulting image 400, an origin point O, the intensity of whose pixel is representative of the maximum pressure exerted on the support 10, and verification means intended to verify that, on the resulting image 400, for a plurality of radii 402 issuing from the origin point O, and for each of said radii 402, for a plurality of points M, the intensity of the pixel of each point M of said radius 402 is representative of a decline in the pressure exerted on the support 10 as the distance from the origin point O to the point M increases.

The decision taking module 108 is intended to take a decision as regards the validity of the support 10 as a function of the results transmitted by the verification means.

A print conventionally exhibits a frequency of ridges of the order of 1.5 to 3 cycles per mm and so as to obtain an image utilizable after the filtering step 306, the cutoff frequency which is applied during this filtering step 306 is of the order of 0.1 to 1 cycles per mm, and more particularly of 0.5 cycles per mm.

On the resulting image 400, the intensity of each pixel is representative of the pressure exerted on the point of the support 10 whose image is said pixel.

According to a particular embodiment of the invention, the verification step 310 consists in using the intensity gradients of the pixels within the resulting image 400 and in verifying that starting from the origin point O and on each radius 402 issuing from the origin point O, the intensity gradient of each point M oriented in the direction OM is negative. If the gradient is positive on moving away from the origin point O, this is an indication of the fact that the support 10 is may be a false finger. The intensity gradient corresponds to the pressure gradient which is exerted on the support 10.

Insofar as it may happen that, even with a real finger, the gradient rises slightly over a portion of a radius 402, for example because of a particular feature of the finger (scar, etc.), or of stray lighting, the decision taking step 312 is preferably based on a cumulative criterion denoted Dism(P, O) and representing the deviation of the intensity profile of the actual intensity profile P from the theoretical model of intensity centered at O of a real finger, and on a comparison of this deviation with respect to a threshold.

If the deviation Dism(P,O) is greater than the threshold, the support 10 is then considered to be a false finger, and if the deviation Dism(P,O) is lower than the threshold, the support 10 is then considered to be a real finger. The result of the comparison between the threshold and the deviation Dism(P,O) serves as basis in the course of the decision taking step 312.

A procedure consists in working in a radial local basis at each point M of the resulting image 400. The radial local basis at M relating to O is the base $(\vec{r}, \vec{t})$ such that $$\vec{r} = \frac{\overrightarrow{OM}}{\|\overrightarrow{OM}\|}$$

and $\vec{t}$ is the unit vector orthogonal to $\vec{r}$ such that $(O, \vec{r}, \vec{t})$ is a right-handed reference frame.

M is a point on the resulting image 400 and $\vec{\nabla}(M)$ denotes the intensity gradient at M. This gradient expressed in the image reference frame may be projected on the radial local basis at M relating to O, and its projection on the radial local basis at M relating to O on the vector $\vec{r}$ may be written $\nabla_r^O(M)$.

In the case of a real finger, that is to say in the case of an ideal intensity profile, the intensity profile normally comprises a single local maximum denoted O and any local gradient projected into its radial local basis at M relating to O is then and thus satisfies the equation:

$$\forall M, \nabla_r^O P(M) \le 0 \qquad (1)$$

where P(M) is the intensity at the point M.

$\nabla_r^O P(M)$ is thus the projection on the radial local basis at M relating to O of the intensity gradient at the point M of the resulting image 400.

Considering the polar coordinate reference frame with center O, the coordinates of the point M in this reference frame are (r,θ) and equation (1) may be written:

$$\forall M(r,\theta), r>0, \theta \in [0, 2\pi], \nabla_r^O P(r,\theta) \le 0. \qquad (2)$$

This corresponds to the fact that the intensity gradient profile along any radius 402 starting from the origin point O is decreasing.

We choose a real function L such that it is zero on $\mathbb{R}^-$ and increasing on $\mathbb{R}^{+*}$.

For example, the function L may be chosen such that:

$$L(x) = \begin{cases} x & \text{if } x > 0 \\ 0 & \text{if } x \le 0 \end{cases}$$

L is a function for selecting the positive gradients, but another function could make it possible to weight the gradients as a function of their intensity.

The deviation Dism(P,O) is then given by the formula:

$$Dism(P, O) = \frac{1}{\text{Area}(P)} \int_0^{2\pi} \int_0^{R_{max}} L(\nabla_r^O P(r, \theta)) \cdot dr \cdot d\theta \qquad (3)$$

where $R_{max}$ is the maximum distance between the origin point O and any point M of the resulting image 400 and where Area(P) is the area of the region considered around the point M and which is here in pixels.

Several procedures may be used to calculate the deviation Dism(P,O). Each calculation procedure offers a compromise between the calculation speed and the exactness of the calculation. Stated otherwise it is possible to choose all the points M so as to have a very accurate value of the deviation Dism(P,O), but in this case the calculation is lengthy, or it is possible to limit the number of points M so as to have a fast calculation but to the detriment of the accuracy in the calculation.

To calculate the integral exactly, for each pixel M of the resulting image 400, the local intensity gradient is calculated and projected onto the radial basis relating to the origin point O.

The sum of all the local projections of the gradients $\nabla_r^O P(r,\theta)$ which are strictly positive is performed. In cartesian coordinates and by taking a width W and a height H for the resulting image 400, formula (3) may be written:

$$Dism(P, O) = \frac{1}{\text{Area}(P)} \sum_{x=0}^{W} \sum_{y=0}^{H} \text{Area}(M(x, y)) \cdot L(\nabla_r^O P(x, y)) \quad (4)$$

where L is the function defined hereinabove and which retains only the positive values.

This amounts to calculating the local gradients over the whole of the resulting image 400 and to summing the projections on the local radial bases which are positive.

Area(M(x,y)) is the area of each zone centered on the point M(x,y) over which the gradient is calculated. Here, this area is equal to a pixel, but it is possible to undersample the calculation so as not to consider all the pixels and speed up the calculation and in this case the area is greater than 1.

Another procedure consists in sampling the angles of integration and calculating the gradients solely along the chosen radii. Along each radius, the local gradients are calculated with an interpolation procedure, and then the sum of the positive gradients is calculated. Each gradient may be weighted by the area of the ring sector that it represents. For example, in the case where the points for calculating the gradients are sampled in a uniform manner with a step size of 1 pixel, and where we choose $\Theta$ angles uniformly sampled over the interval $[0,2\pi]$ and which are generally 8 or 16 in number, formula (3) is approximated by the formula:

$$Dism(P, O) \approx \frac{1}{\text{Area}(P)} \sum_{\theta=0}^{\Theta-1} \sum_{j=1}^{R_{max}} \text{Area}(R_j) \cdot Pos(\nabla_r^O P(r, \theta)) \quad (5)$$

and as the area of a ring sector of mean radius j, of thickness 1 and of angle $$\frac{2\pi}{\Theta}$$

equals $$\frac{2\pi}{\Theta} \times 2j,$$

formula (5) becomes:

$$Dism(P, O) \approx \frac{4\pi}{\Theta \cdot \text{Area}(P)} \sum_{\theta=0}^{\Theta-1} \sum_{j=1}^{R_{max}} j \cdot L(\nabla_r^O P(r, \theta)) \quad (6)$$

The deviation Dism(P,O) is not bounded and represents the divergences from the theoretical model and it is then possible to define a threshold for the deviation Dism(P,O) beyond which the decision taking module 108 will consider the support 10 to be a false finger and short of which it will consider the support 10 to be a real finger. This threshold will be able to be determined with the help of a base representative of real fingers or with the help of a base of real and of false fingers. A neural net or an SVM will for example be used.

The decision threshold is defined with the help of a measurement defined on a representative base of real fingers.

Between the capture step 304 and the filtering step 306, a preprocessing step 305 may be put in place, in order to improve the rendition of the resulting image 400.

The processing module 106 then comprises preprocessing means intended to implement the preprocessing step 305.

With the help of the captured image 200, the processing module 106 determines an image S representative of a skeleton of ridges and of a skeleton of valleys (inter-ridges). Such a determination is described for example in the document [Alessandro Farina, Zsolt M. Kovacs-Vajna, Alberto Leone, "Fingerprint Minutiae Extraction from Skeletonized Binary Images," *Pattern Recognition*, Vol. 32, pp. 877-889, 1999].

At each point of the skeleton of ridges, the processing module 106 calculates the local width of the ridge, and at each point of the skeleton of valleys, the processing module 106 calculates the local width of the valley. Such calculations are illustrated in FIG. 5 which shows skeletons of ridges 502 and skeletons of valleys 504 as gray levels. For each point P of the skeleton of ridges 502, the width "d" of the corresponding ridge is measured along the normal to the skeleton, d1 and d2 being the widths of the valleys.

The processing module 106 then constructs a matrix, denoted Rr, of the ridges and a matrix, denoted Rir, of the valleys. The matrix Rr and the matrix Rir have the same size as the captured image 200 and each coefficient of row x and of column y corresponds to the pixel, denoted (x, y), of row x and of column y of said captured image 200.

According to one embodiment, for each pixel (x, y) not belonging to the skeleton of the ridges, the corresponding coefficient $R_r(x, y)$ of the ridges matrix Rr is zero and for each pixel (x, y) belonging to the skeleton of the ridges, the corresponding coefficient $R_r(x, y)$ of the ridges matrix Rr equals the local width of the ridge in this pixel (x, y).

For each pixel (x, y) not belonging to the skeleton of the valleys, the corresponding coefficient $R_{ir}(x, y)$ of the valleys matrix Rir is zero and for each pixel (x, y) belonging to the skeleton of the valleys, the corresponding coefficient $R_{ir}(x, y)$ of the valleys matrix Rir equals the local width of the valley in this pixel (x, y).

Another procedure for defining $R_r(x, y)$ and $R_{ir}(x, y)$ consists in defining the density of ridges (resp. valleys) around the pixel (x,y). $R_r$ can thus be defined as the number of pixels of ridges in a zone centered on the pixel (x,y) while $R_{ir}(x, y)$ may be defined as the number of pixels of valleys in a zone centered on the pixel (x,y). $R_r$ and $R_{ir}$ are thus no longer defined as distances as in the first procedure described but by a notion of density.

Another procedure for defining $R_r(x, y)$ and $R_{ir}(x, y)$ is the following, for each pixel $(x, y)$ of the captured image:

when the pixel $(x, y)$ does not belong to the pixels of the ridges, $R_r(x, y)$ is equal to the average value of the local widths of adjacent ridges on either side of the valley including the pixel, at the level of said pixel, when the pixel $(x, y)$ belongs to the pixels of the ridges, $R_r(x, y)$ equals the local width of the ridge in this pixel $(x, y)$, when the pixel $(x, y)$ does not belong to the pixels of the valleys, $R_{ir}(x, y)$ is equal to the average value of the local widths of adjacent valleys on either side of the ridge including this pixel, at the level of said pixel, and when the pixel $(x, y)$ belongs to the pixels of the valleys, $R_{ir}(x, y)$ equals the local width of the valley in this pixel $(x, y)$.

The function F is a function which transforms the captured image 200 into a preprocessed image denoted IP and which is a monotonic function of the intensity of the pixels $(x, y)$ of the captured image 200, and which is such that for any pixel $(x, y)$ of the captured image 200 belonging to one of the two skeletons, the pixel $(x, y)$ of the preprocessed image IP takes a positive value of intensity, and for any pixel $(x, y)$ of the captured image 200 not belonging to one of the two skeletons, the pixel $(x, y)$ of the preprocessed image IP takes a zero value of intensity.

For example, it is possible to take the function $F(x, y)$ defined by the formula:

$$F(x, y) = (255 - p(x, y)) \cdot \frac{R_r(x, y)}{R_{ir}(x, y)} \quad (7)$$

The preprocessed image IP can then undergo the filtering step 306.

It is also possible to carry out the preprocessing step 305 and the filtering step 306 simultaneously. For example, it is possible to use the function $F(x, y)$ defined by the formula:

$$F(x, y) = G_\Sigma * \left( \alpha(255 - p(x, y)) + \beta \frac{R_r(x, y)}{R_{ir}(x, y)} \right) \text{ with } \alpha + \beta = 1 \quad (8)$$

That is to say the function F is the convolution of the weighted sum of the captured image 200 and of the image of ratio ridges width to valleys width, with a covariance matrix gaussian. In practice, a is chosen between 0 and 0.5.

The image obtained can then be regarded directly as the resulting image 400.

It may happen that the resulting image 400 exhibits a plurality of points and that each of these points have an intensity of the pixel which is representative of a maximum pressure. The resulting image 400 then comprises a plurality of origin points O.

Use is then made of the notion of local maximum pressure around each origin point O. The locale of the search zone for an origin point O may be defined for example by the minimum distance between this origin point and all the other origin points. This distance may be tailored with a coefficient so that the zone is distanced from the other origin points. A practical value of this coefficient is 2.

In the case where several origin points O are defined, the deviation may be defined by doing the deviation calculation for each origin point O several times. The consolidation is done by analyzing the various results regarding each origin point O (for example min, max, mean, etc.). The final decision is made by thresholding the deviation defined after this consolidation.

Of course, the present invention is not limited to the examples and embodiments described and represented, but it is susceptible to numerous variants accessible to the person skilled in the art.

The invention claimed is:

1. Method of validation of the use of a real finger as support of a fingerprint, implemented by a validation device comprising a capture surface on which said support bears, a sensor intended to capture an image of the fingerprint, a processing module and a decision taking module, said method of validation comprising:

a positioning step during which the support is placed such that it bears against the capture surface, a capture step during which the sensor captures a so-called captured image of the print, a filtering step during which the processing module transforms the captured image into a resulting image by passage through a low-pass filter whose cutoff frequency is much lower than the frequency of the ridges of a print, a locating step during which the processing module locates on the resulting image, an origin point O, the intensity of whose pixel is representative of the maximum pressure exerted on the support, a verification step during which the processing module verifies that, on the resulting image, for a plurality of radii issuing from the origin point O, and for each of said radii, for a plurality of points M, the intensity of the pixel of each point M of said radius is representative of a decline in the pressure exerted on the support as the distance from the origin point O to the point M increases, and a decision taking step during which the decision taking module takes a decision as regards the validity of the support as a function of the results of the verification step.

2. Method of validation according to claim 1, wherein that said cutoff frequency is of the order of from 0.1 to 1 cycle per mm.

3. Method of validation according to claim 1, wherein the verification step consists in verifying that starting from the origin point O and on each radius issuing from the origin point O, the intensity gradient of each point M is negative.

4. Method of validation according to claim 3, wherein the decision taking step is based on a cumulative criterion denoted Dism(P,O) and representing the deviation of the intensity profile of the actual intensity profile P from the theoretical model of intensity centered at O of a real finger and on a comparison of this deviation Dism(P,O) with respect to a threshold.

5. Method of validation according to claim 4, wherein the deviation Dism(P,O) is given by the formula:

$$Dism(P, O) = \frac{1}{\text{Area}(P)} \int_0^{2\pi} \int_0^{R_{max}} L(\nabla_r^O P(r, \theta)) \cdot dr \cdot d\theta \quad (3)$$

where:

$\nabla_r^O P(r,\theta)$ is the projection on the radial local basis at M relating to O of the intensity gradient at the point M of the resulting image with polar coordinates $(r,\theta)$, L is a zero function on $\mathbb{R}^-$ and an increasing function on $\mathbb{R}^{+*}$, $R_{max}$ is the maximum distance between the origin point O and any point M of the resulting image, and Area(P) is the area of the region considered around the point M.

6. Method of validation according to claim 1, wherein it comprises a preprocessing step intended to improve the rendition of the resulting image, between the capture step and the filtering step.

7. Method of validation according to claim 6, wherein the preprocessing step consists in applying to the pixels of the captured image, a function F defined by the formula:

$$F(x, y) = (255 - p(x, y)) \cdot \frac{R_r(x, y)}{R_{ir}(x, y)} \qquad (7)$$

where when the pixel (x, y) does not belong to the pixels of the ridges, $R_r$ is equal to the average value of the local widths of adjacent ridges on either side of the valley including the pixel, at the level of said pixel, and where when the pixel belongs to the pixels of the ridges, $R_r$ equals the local width of the ridge in this pixel, where when the pixel does not belong to the pixels of the valleys, $R_{ir}$ is equal to the average value of the local widths of adjacent valleys on either side of the ridge including this pixel, at the level of said pixel, and where when the pixel belongs to the pixels of the valleys, $R_{ir}$ equals the local width of the valley in this pixel.

8. Method of validation according to claim 6, wherein the preprocessing step consists in applying to the pixels of the captured image, a function F defined by the formula:

$$F(x, y) = (255 - p(x, y)) \cdot \frac{R_r(x, y)}{R_{ir}(x, y)} \qquad (7)$$

where when the pixel does not belong to the skeleton of the ridges, $R_r$ is zero, and where when the pixel (x, y) belongs to the skeleton of the ridges, $R_r$ equals the local width of the ridge in this pixel, where when the pixel does not belong to the skeleton of the valleys, $R_{ir}$ is zero, and where when the pixel belongs to the skeleton of the valleys, $R_{ir}$ equals the local width of the valley in this pixel.

9. Method of validation according to claim 6, wherein the preprocessing step consists in applying to the pixels of the captured image, a function F defined by the formula:

$$F(x, y) = (255 - p(x, y)) \cdot \frac{R_r(x, y)}{R_{ir}(x, y)} \qquad (7)$$

where $R_r$ is the number of pixels of ridges in a zone centered on the pixel, and where $R_{ir}$ is the number of pixels of valleys in a zone centered on the pixel.

10. Method of validation according to claim 1, wherein the locating step consists in choosing the origin point O as the point of the resulting image exhibiting the highest intensity.

11. Validation device comprising:

a capture surface on which said support bears, a sensor intended to capture an image of the fingerprint, a processor configured to:

transform the captured image into a resulting image by passage through a low-pass filter whose cutoff frequency is much lower than the frequency of the ridges of a print, locate on the resulting image, an origin point O, the intensity of whose pixel is representative of the maximum pressure exerted on the support, verify that, on the resulting image, for a plurality of radii issuing from the origin point O, and for each of said radii, for a plurality of points M, the intensity of the pixel of each point M of said radius is representative of a decline in the pressure exerted on the support as the distance from the origin point O to the point M increases, and take a decision as regards the validity of the support as a function of the results transmitted by the processor.

* * * * *